T. SPENCER.
GRASS ELEVATOR FOR HORSE LAWN MOWERS.
APPLICATION FILED JULY 22, 1909.
954,007.
Patented Apr. 5, 1910.
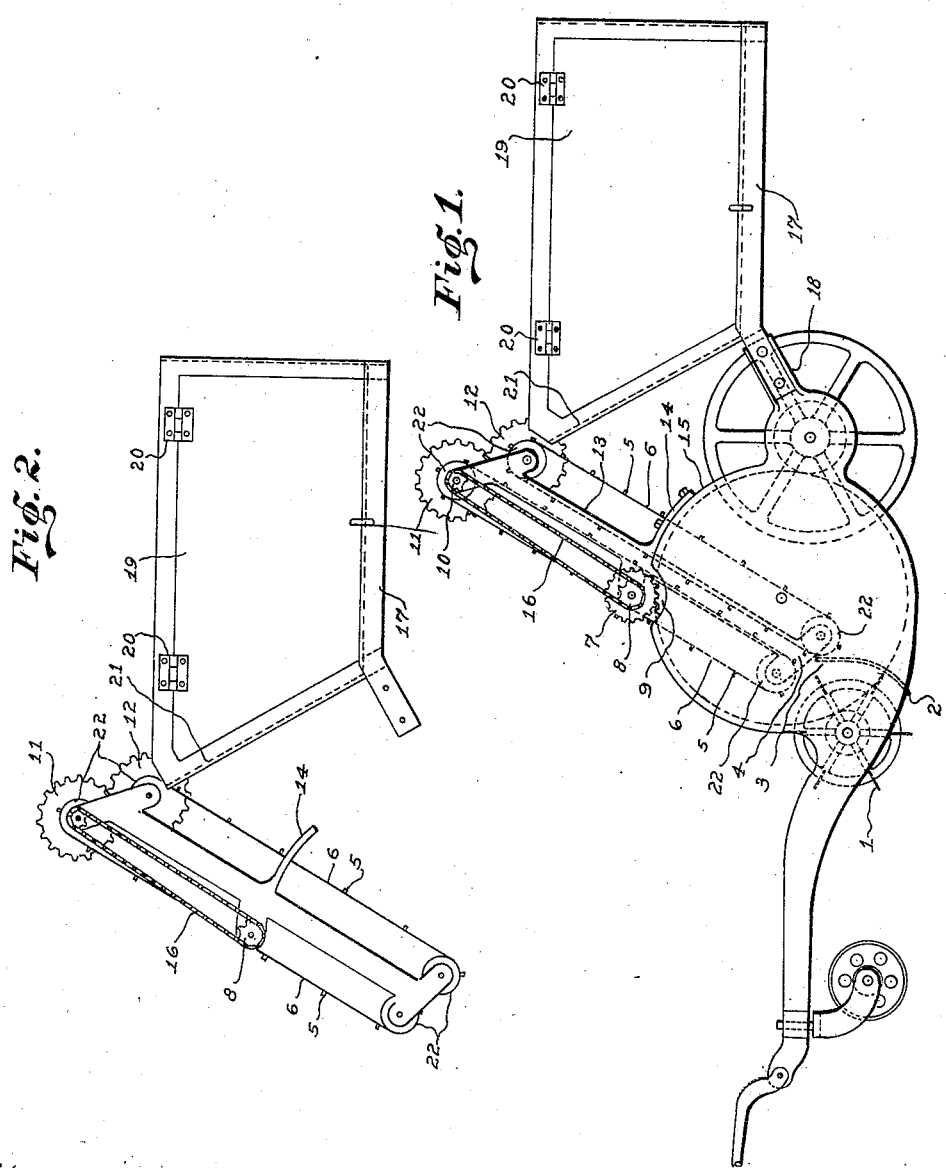
Witnesses.
Inventor:
Thomas Spencer
By J. Jewell
Attorney.

UNITED STATES PATENT OFFICE.

THOMAS SPENCER, OF PUEBLO, COLORADO.

GRASS-ELEVATOR FOR HORSE LAWN-MOWERS.

954,007.     Specification of Letters Patent.     Patented Apr. 5, 1910.

Application filed July 22, 1909. Serial No. 509,022.

*To all whom it may concern:*

Be it known that I, THOMAS SPENCER, a citizen of the United States, residing at the city of Pueblo, in the county of Pueblo and State of Colorado, have invented certain new and useful Improvements in Grass-Elevators for Horse Lawn-Mowers; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to improvements in grass elevators for horse lawn mowers, in which two slatted belts are driven by the lawn mower gearing through a geared connection thereto by means of sprocket wheels and sprocket chain in such manner, that the adjacent surfaces of the slatted belts move in the same direction, so that the grass thrown up by the mower will be held between the belts and conveyed upward and deposited into a suitable receptacle: and the objects of my invention are: first, to provide a grass elevator for a lawn mower which receives its power from the moving parts of the lawn mower: and second, to provide a grass elevator that will securely hold the grass from the point where it receives the grass to the point of delivery into an attached receptacle. I attain these objects by the mechanism illustrated in the accompanying drawings, in which—

Figure 1 is a side elevation of a lawn mower with my improvements attached thereto in position for operation: and Fig. 2 is a side elevation of my invention removed from the lawn mower.

Similar numerals refer to similar parts shown in the drawings.

At the rear of, and near the blades (1) of the cutting drum of a lawn mower, a curved cutting plate (2) is securely attached in such manner that grass cut by the blades of the mower will be cast upwardly toward the point (3) until it arrives at the upper slatted belt (6). The slats (5) which engage the grass at the point (4) and convey it to the lower slatted belt (6), where the grass is securely held by the slats of both belts and conveyed upward between them, and the surfaces of the belts (6) moving upwardly at the same speed, the grass is conveyed up to the end of the belt carrier and dropped onto the slanted side (21) of the attached receptacle. The receptacle is attached by bolts to the casting (18) of the lawn mower by the bent bar (17) on which the sides and end of the receptacle are securely attached, the door (19) being hinged by hinges (20) so they may be opened outwardly, so as to permit the grass to be cast out of the receptacle to the ground.

The slatted belts operate over rollers (22) which are carried at the sides of the casting (13) which is secured by bolts through arms (14) to the housing (15) of the lawn mower. The two lower rollers (22) are idlers over which belts (6) turn; the upper rollers are secured to their shafts, one shaft having a gear thereon (11) and the other a gear (12), the gears being of the same proportions and meshing together. One of these upper shafts carries a sprocket wheel (10) on which sprocket chain (16) operates, the latter receiving power from sprocket wheel (8) which is secured on the same shaft that carries gear wheel (7), which receives its power from gear (9) of the lawn mower. Power is thus transmitted from the lawn mower to operate the slatted belts (6), which move at equal speeds, gears (11) and (12) being the same size.

Having thus described my invention so that those who are versed in the art can construct and use the same, I claim:

The combination with a mower having a frame, ground wheels and a gear wheel driven by one of said ground wheels, of a conveyer frame connected to the mower frame and extending at an angle therefrom, rollers at opposite ends of said conveyer frame, conveyer belts on said rollers, gear wheels on two of said rollers meshing with each other, an intermediate shaft, a gear wheel on said shaft driven by said first mentioned gear wheel, and means connecting said shaft and one of said rollers whereby the latter are caused to rotate, and the adjacent face of the belts caused to travel in the same direction.

In testimony whereof, I affix my signature, in presence of two witnesses.

THOMAS SPENCER.

Witnesses:
C. E. SMITHE,
W. L. HARTMAN.